United States Patent
Jung (10) Patent No.: US 8,018,620 B2
(45) Date of Patent: Sep. 13, 2011

(54) METHOD AND APPARATUS FOR PERFORMING PRINTING JOB BY ADJUSTING COLOR INFORMATION

(75) Inventor: Joo-young Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1341 days.

(21) Appl. No.: 11/546,482

(22) Filed: Oct. 12, 2006

(65) Prior Publication Data

US 2007/0153307 A1    Jul. 5, 2007

(30) Foreign Application Priority Data

Dec. 30, 2005    (KR) ........................ 10-2005-0135881

(51) Int. Cl.
- G06F 15/00 (2006.01)
- G06K 1/00 (2006.01)
- H04N 1/60 (2006.01)
- G06F 3/12 (2006.01)

(52) U.S. Cl. ........................................ 358/1.9; 358/1.13

(58) Field of Classification Search .................... 358/1.9, 358/1.13, 3.22, 3.23
See application file for complete search history.

(56) References Cited

U.S. PATENT DOCUMENTS

| 6,241,339 B1 | 6/2001 | Kondo |
| 2004/0057061 A1 | 3/2004 | Bochkarev |
| 2004/0136016 A1 | 7/2004 | Oshikawa et al. |
| 2007/0211097 A1 * | 9/2007 | Yamazaki et al. ............... 347/14 |
| 2008/0030801 A1 * | 2/2008 | Yamada et al. ................ 358/474 |
| 2008/0165379 A1 * | 7/2008 | Zuber ............................. 358/1.9 |

FOREIGN PATENT DOCUMENTS

| JP | 7-177352 | 7/1995 |
| JP | 11-187278 | 7/1999 |
| JP | 2005-119204 | 5/2005 |
| KR | 1999-20924 | 3/1999 |

OTHER PUBLICATIONS

Chinese Office Action issued Jan. 8, 2010 in corresponding Chinese Patent Application 2006101669687.
Office Action issued in Chinese Patent Application No. 200610166968.7 dated Jul. 18, 2008.

\* cited by examiner

Primary Examiner — Douglas Tran
(74) Attorney, Agent, or Firm — Staas & Halsey LLP (57) ABSTRACT

A method and apparatus to perform a printing job by adjusting color information include updating a predetermined color conversion table stored in an image forming device by inputting color adjustment information from a user, and performing the printing job using the updated color conversion table. Accordingly, the printing job is performed by adjusting color information regardless of whether an emulator of the image forming device supports a color adjustment function, increasing the efficiency of the printing operation. Additionally, when printing jobs are performed by repeatedly adjusting color information using the same color adjustment information, since the color information is converted using the same color conversion table as the color conversion table is updated using the color adjustment information, a waste of time for the color conversion is reduced. Furthermore, a function of the emulator does not have to be changed to perform a printing job, even if a function of an image forming device driver is changed to add a color adjustment function to the image forming device.

10 Claims, 5 Drawing Sheets

METHOD AND APPARATUS FOR PERFORMING PRINTING JOB BY ADJUSTING COLOR INFORMATION

CROSS-REFERENCE TO RELATED APPLICATIONS

This application claims the benefit of Korean Patent Application No. 2005-135881, filed on Dec. 30, 2005, in the Korean Intellectual Property Office, the disclosure of which is incorporated herein by reference.

BACKGROUND OF THE INVENTION

1. Field of the Invention

Aspects of the present invention relate to an image forming device, and more particularly, to a method and apparatus for performing a printing job by adjusting color information using a color conversion table, which is stored in an image forming device and updated by a user inputting color adjustment information.

2. Description of the Related Art

Figure 1:
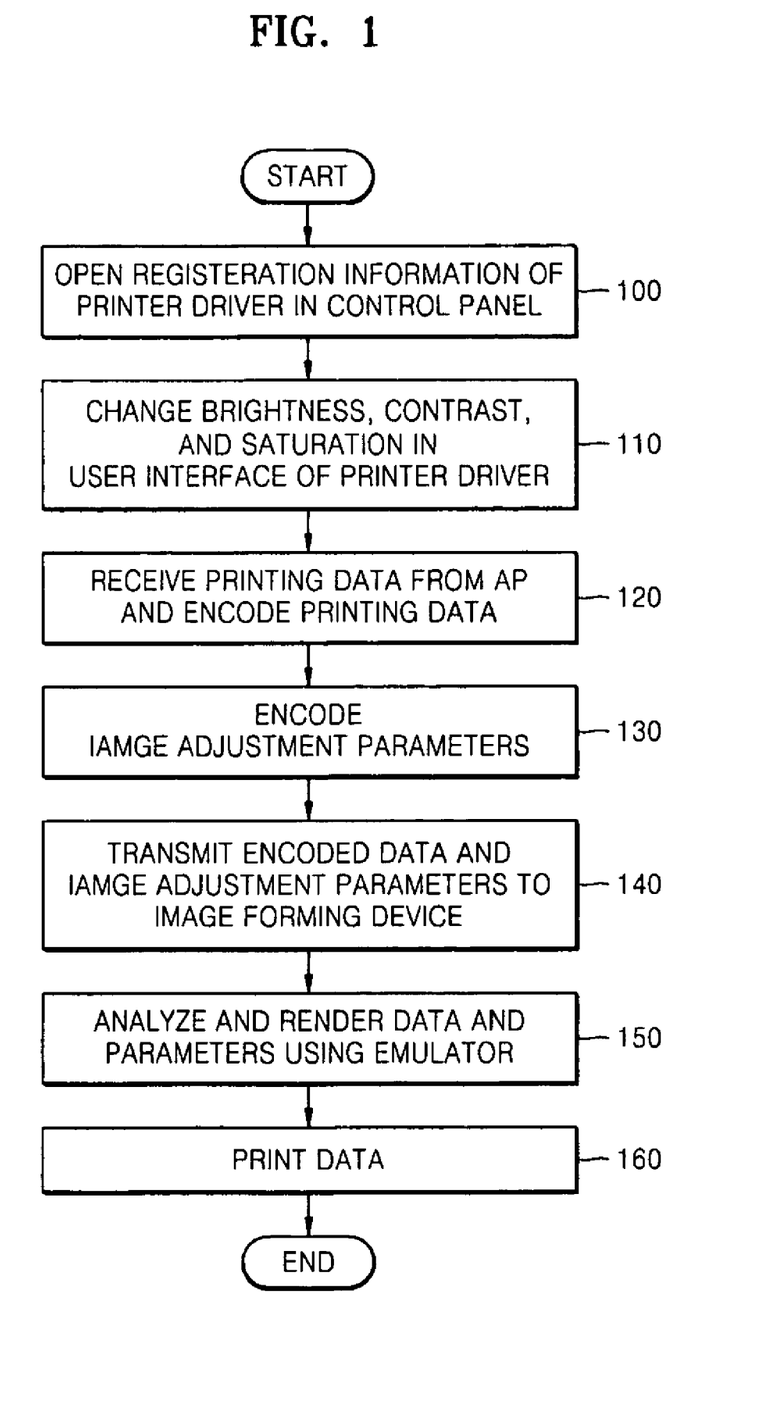
FIG. 1 is a flowchart illustrating a conventional method of performing a printing job by adjusting color information.

FIG. 1 is a flowchart illustrating a conventional method of performing a printing job by adjusting color information.

Referring to FIG. 1, in operation 100, a user opens registration information of a printer driver in a control panel of a computer operating system, such as Microsoft Windows. In operation 110, the user changes the setting values of brightness, contrast, and saturation in a user interface of the printer driver. In operation 120, the printer driver receives data, which is to be printed, from an application program and encodes the data in a printer control language (PCL) or PostScript (PS) code. In operation 130, the printer driver encodes image adjustment parameters according to the changed setting values of operation 110. In operation 140, the printer driver transmits the data encoded in operation 120, along with the image adjustment parameters encoded in operation 130, to an image forming device, such as a printer, a copier, etc. In operation 150, the image forming device analyzes and renders the data and image adjustment parameters received in operation 140 using an emulator. In operation 160, the image forming device prints the result of operation 150 onto a printing medium, such as paper, etc.

According to this conventional method of performing a printing job by adjusting color information, the printing job will only be performed by adjusting the color information in the emulator to which the image adjustment parameters encoded in operation 130 is applied if the emulator supports relevant color adjustment functions. If the emulator does not support relevant color adjustment functions, a user must perform a process of encoding adjusted output data by directly applying some color adjustment to the output data in an image forming device driver into data of the PCL or PS code. Then, the emulator of the image forming device processing the encoded data processes the remaining color adjustment functions supported thereby. This conventional method of processing a color adjustment function is inefficient.

In addition, if a color adjustment function added to the conventional method changes the image forming device driver, the emulator must be modified to perform a printing job using the added color adjustment function.

In addition, even if a printing job is repeatedly performed by adjusting color in the same way, the same job of encoding image adjustment parameters and analyzing the encoded image adjustment parameters in the emulator must be repeatedly performed for each printing job. Thus, the conventional method is inefficient for this reason as well.

SUMMARY OF THE INVENTION

Aspects of the present invention provide a method and apparatus for performing a printing job by adjusting color information using a color conversion table, which is stored in an image forming device, the color conversion table being updated by a user inputting color adjustment information.

According to an aspect of the present invention, there is provided a method of performing a printing job by adjusting color information, the method including updating a predetermined color conversion table by inputting color adjustment information from a user, and performing the printing job using the updated color conversion table.

The updating may include inputting the color adjustment information from the user, generating a color conversion table using the input color adjustment information, and updating the stored color conversion table into the generated color conversion table.

In the inputting, a user interface which adjusts the color information may be provided to the user.

In the updating to the generated color conversion table, if a printing request is inputted after the generation of the color conversion table, the generated color conversion table may be transmitted to the image forming device to update the stored color conversion table.

The generation may include generating an RGB-to-RGB table using the input color adjustment information, and generating an RGB-to-CMYK table by combining the generated RGB-to-RGB table with a stored default RGB-to-CMYK table.

The method may further include storing the updated color conversion table and selecting a color conversion table to be used among the stored color conversion tables.

In the performing of the printing job, the printing job may be performed using the selected color conversion table.

According to another aspect of the present invention, there is provided a computer-readable recording medium which stores a computer-readable program to execute the method described above.

According to another aspect of the present invention, there is provided an apparatus which performs a printing job by adjusting color information, the apparatus including a table generator which generates a color conversion table when the table generator receives color adjustment information, a table storage unit which stores the generated color conversion table, and a printing unit which performs the printing job using the stored color conversion table.

The table generator may include an information input unit which inputs the color adjustment information from a user, and a color conversion table generator which generates a color conversion table using the input color adjustment information.

The information input unit may provide a user interface which adjusts the color information to the user.

The color conversion table generator may include an RGB table generator which generates an RGB-to-RGB table using the input color adjustment information, and a CMYK table generator which generates an RGB-to-CMYK table by combining the generated RGB-to-RGB table and a stored default RGB-to-CMYK table.

The apparatus may further include a table transmitter which transmits the generated color conversion table to the table storage unit in response to a printing request.

The apparatus may further include a table selector which allows the user to select a color conversion table to be used among the stored color conversion tables.

The printing unit may perform the printing job using the selected color conversion table.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
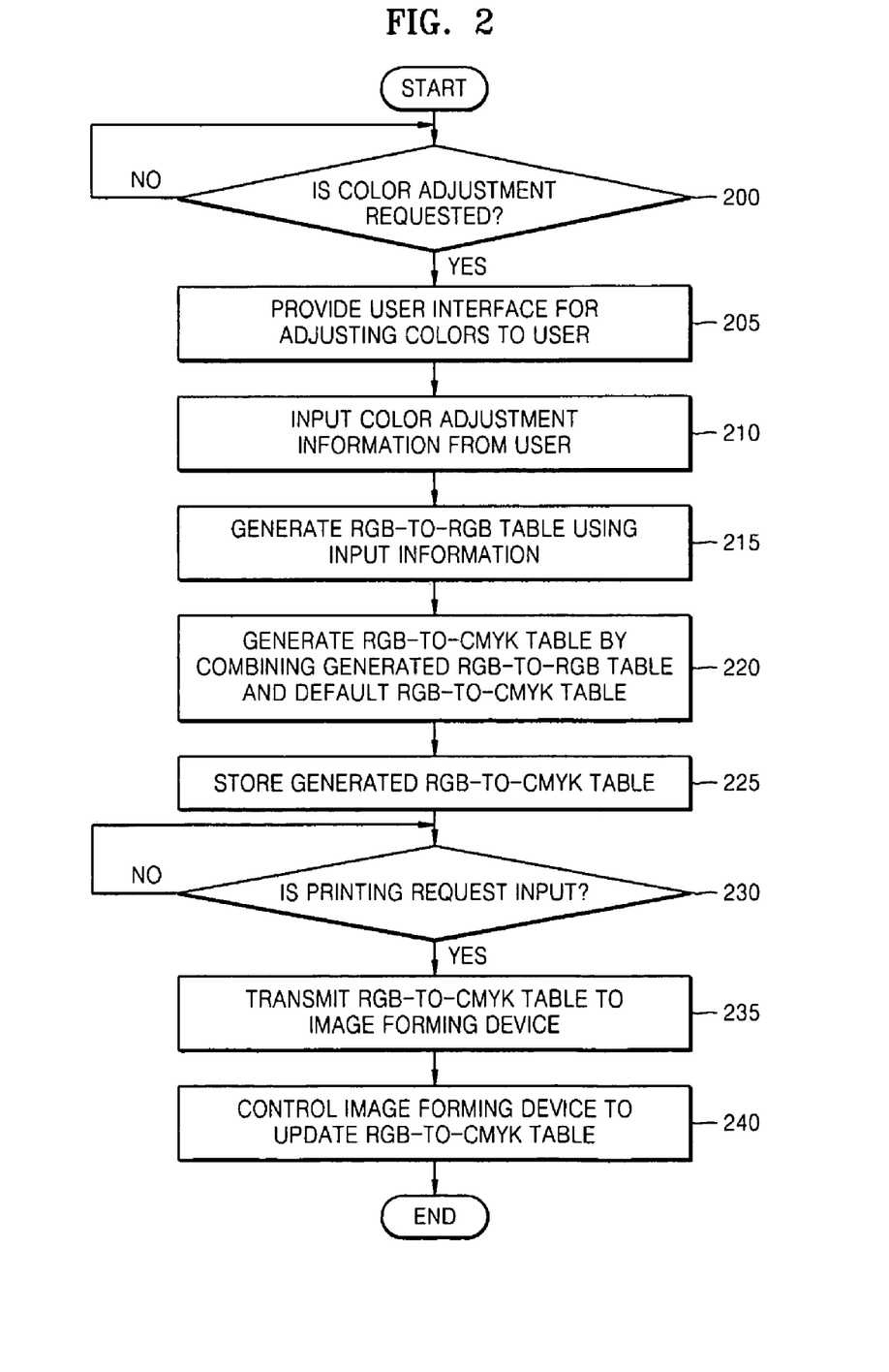
FIG. 2 is a flowchart illustrating a process of updating a color conversion table in a method of performing a printing job according to an embodiment of the present invention.

FIG. 2 is a flowchart illustrating a process of updating a color conversion table in a method of performing a printing job according to an embodiment of the present invention. FIG. 2 is an illustration of a host device, such as a personal computer, which inputs color adjustment information, generates a color conversion table, and updates a stored color conversion table. The generated color conversion table is a lookup table containing color information, such as cyan (C), magenta (M), yellow (Y), and black (K) corresponding to generally used color information red (R), green (G), and blue (B), used to perform a printing job in an image forming device, such as a printer, a copier, etc.

In operation 200, the host device determines whether a user has requested an adjustment of the color of data to be printed by the image forming device. The user adjusts the color of data by using a user interface, such as the printer registration information in a control panel of a Windows program, to set a printing environment of an image forming device driver.

If the host device determines that the user has requested an adjustment of color in operation 200, then in operation 205, the host device provides a user interface to the user in which the user inputs color adjustment information.

In operation 210, the user inputs color adjustment information using the user interface provided in operation 205. The color adjustment information of operation 210 is information used to adjust various factors used to print colors, such as brightness, contrast, saturation, Gamma, S-like curve, and preferable color.

In operation 215, the host device generates an RGB-to-RGB table using the color adjustment information inputted in operation 210.

For example, if the user inputs color adjustment information to increase the brightness by 10, then in operation 215, an RGB-to-RGB table in which (0,0,0)→(10,10,10), (0,0,16)→(10,10,26), (0,0,32)→(10,10,42), . . . , (0,0,240)→(10,10,250), (0,0,255)→(10,10,255), (0,16,0)→(10,26,10), . . . , (0,16,255)→(10,26,255), (16,0,0)→(26,10,10), . . . , (16,255,255)→(26,255,255), . . . , (255,255,255)→(255,255,255) are set is generated by increasing the brightness by 10 from an existing default RGB-to-RGB table in which (0,0,0)→(0,0,0), (0,0,16)→(0,0,16), (0,0,32)→(0,0,32), . . . , (0,0,240)→(0,0,240), (0,0,255)→(0,0,255), (0,16,0)→(0,16,0), . . . , (0,16,255)→(0,16,255), . . . , (16,0,0)→(16,0,0), . . . , (16,255,255)→(16,255,255),   .     .    .    ,   (255,255,255)→(255,255,255) are set.

In operation 220, the host device generates an RGB-to-CMYK table by combining the RGB-to-RGB table generated in operation 215 with a default RGB-to-CMYK table. Specifically, a new RGB-to-CMYK table is generated based on the output values which are obtained by inputting the output values of the RGB-to-RGB table generated in operation 215 into the default RGB-to-CMYK table stored in the host device. For example, when the default RGB-to-CMYK table in which CMYK values corresponding to input RGB values, such as (R0,G0,B0)→(C0,M0,Y0,K0), are stored, a new RGB-to-CMYK table of (R0,G0,B0)→(C',M',Y',K') is generated by calculating (C',M',Y',K') corresponding to output values (10,10,10), (10,10,26), (10,10,42), . . . , (10,10,250), (10,10,255), (10,26,10), . . . , (10,26,255), (26,10,10), . . . , (26,255,255), . . . , (255,255,255) of the RGB-to-RGB table generated in operation 215 when the user inputted color adjustment information to increase the brightness by 10.

In operation 225, the host device temporarily stores the RGB-to-CMYK table generated in operation 220.

In operation 230, the host device determines whether a user has inputted a printing request.

If the host device determines that a user has inputted a printing request in operation 230, then in operation 235, the host device transmits the RGB-to-CMYK table stored in operation 225 to the image forming device.

In operation 240, the image forming device replaces a predetermined stored RGB-to-CMYK table with the RGB-to-CMYK table transmitted to the image forming device in operation 235.

The processes of inputting color adjustment information from the user, generating a color conversion table, and updating a stored color conversion table may also be performed by the image forming device instead of the host device, as described below.

Operations 200 through 225 are performed by the image forming device in substantially the same way as these operations are performed by the host device (described above).

However, in operation 205, the image forming device provides the user interface to the user in a display panel included in the image forming device, and the user inputs color adjustment information using an operation panel, such as, for example, a keypad, instead of using the printer registration information in a control panel of a Windows program.

In addition, when the image forming device is used instead of the host device, the image forming device is pre-set to perform the printing job using the RGB-to-CMYK table stored in operation 225, and thus, operations 230 through 240 above are skipped.

Figure 3:
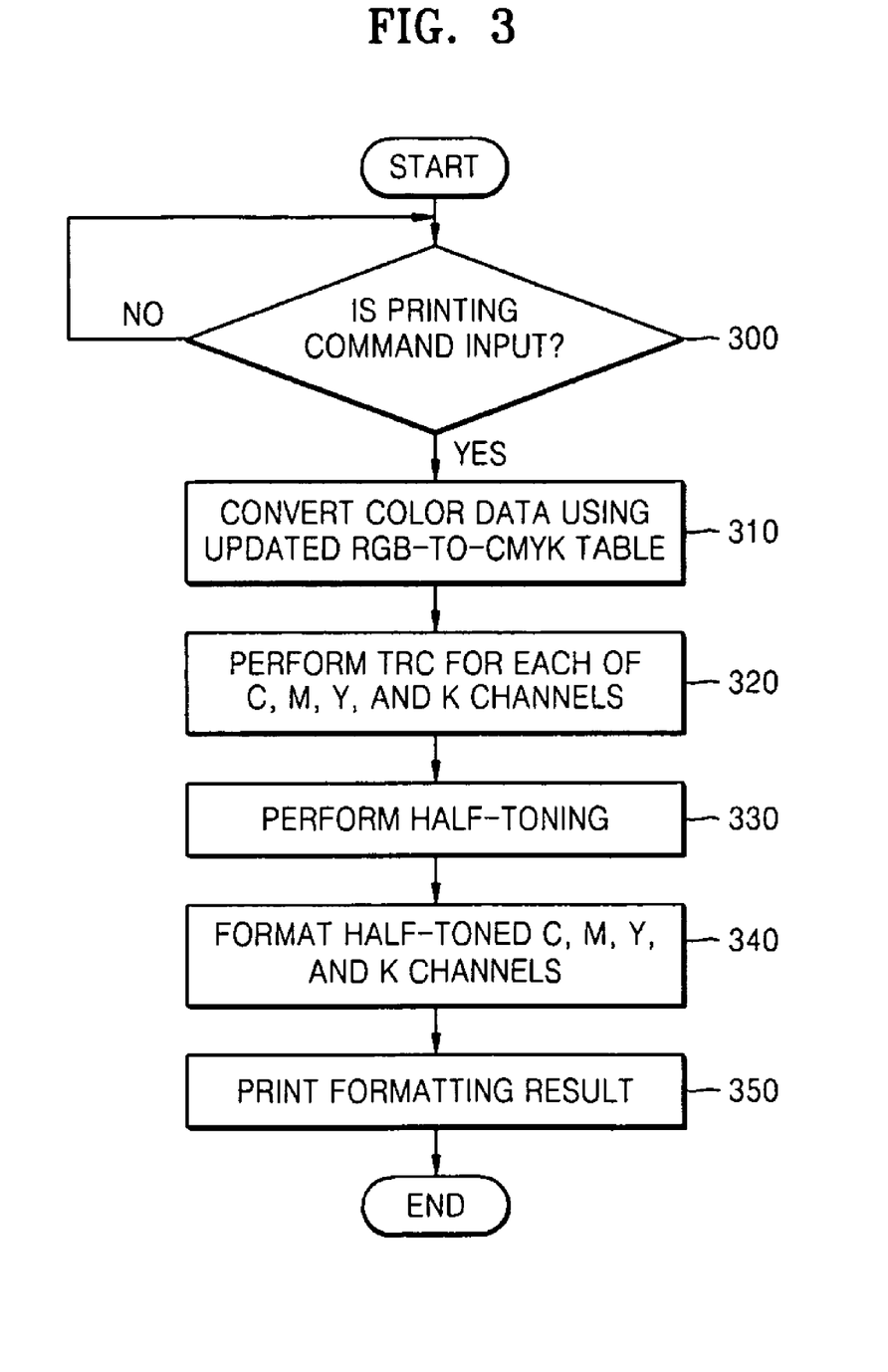
FIG. 3 is a flowchart illustrating a process of performing a printing job using the updated color conversion table in the method of performing a printing job according to an embodiment of the present invention.

FIG. 3 is a flowchart illustrating a process of performing a printing job using the updated color conversion table in the method of performing a printing job according to an embodiment of the present invention.

Referring to FIG. 3, in operation 300, the image forming device determines whether a user has inputted a printing command.

If the user has inputted a printing command, then in operation 310, RGB color data corresponding to the printing data requested in operation 300 is converted to CMYK color data using the updated RGB-to-CMYK table from operation 240.

In operation 320, the image forming device performs a Tone Reproduction Curve (TRC) operation for each of the C, M, Y, and K channels with respect to the CMYK data converted in operation 310.

In operation 330, the image forming device performs a half-toning operation on each of the C, M, Y, and K channels from operation 320.

In operation 340, the image forming device formats the C, M, Y, and K channels which have undergone the half-tone operation of operation 330.

In operation 350, the printer prints the image formatted in operation 340 onto a printing medium, such as paper, etc.

Figure 4:
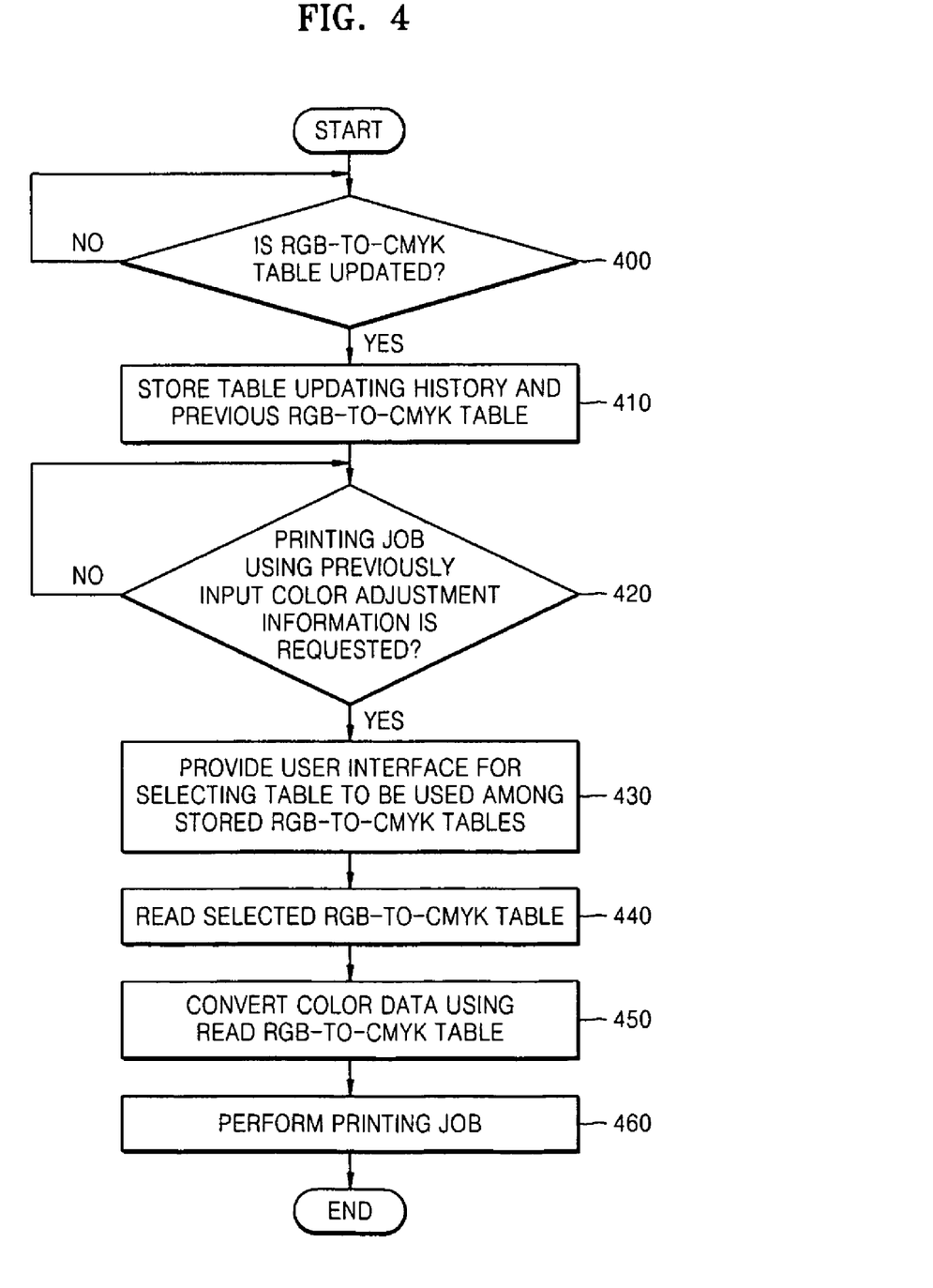
FIG. 4 is a flowchart illustrating a process of performing a printing job by selecting one of the stored color conversion tables in the method of performing a printing job according to an embodiment of the present invention.

FIG. 4 is a flowchart illustrating a process of performing a printing job by selecting one of the stored color conversion tables during the method of performing a printing job according to an embodiment of the present invention.

Referring to FIG. 4, in operation 400, the image forming device determines whether the RGB-to-CMYK table was updated in operation 240.

If the image forming device determines that the RGB-to-CMYK table was updated in operation 400, then in operation 410, the image forming device stores a history of the updated RGB-to-CMYK table as well as the previous RGB-to-CMYK table from before the updating process.

In operation 420, the image forming device determines whether the user has requested a printing job using the same color adjustment information as the color adjustment information used in a previous printing job which had been performed using adjusted color information.

If the image forming device determines that a user has requested a printing job using the same previously inputted color adjustment information, then, in operation 430, the image forming device provides the user with a user interface which selects an RGB-to-CMYK table among the RGB-to-CMYK tables stored in operation 400 to be used in the current printing job.

In operation 440, the image forming device reads the RGB-to-CMYK table selected by the user using the user interface provided in operation 430.

In operation 450, the image forming device processes color information using the RGB-to-CMYK table read in operation 440.

In operation 460, the printer performs the printing job using the color information processed in operation 450.

Figure 5:
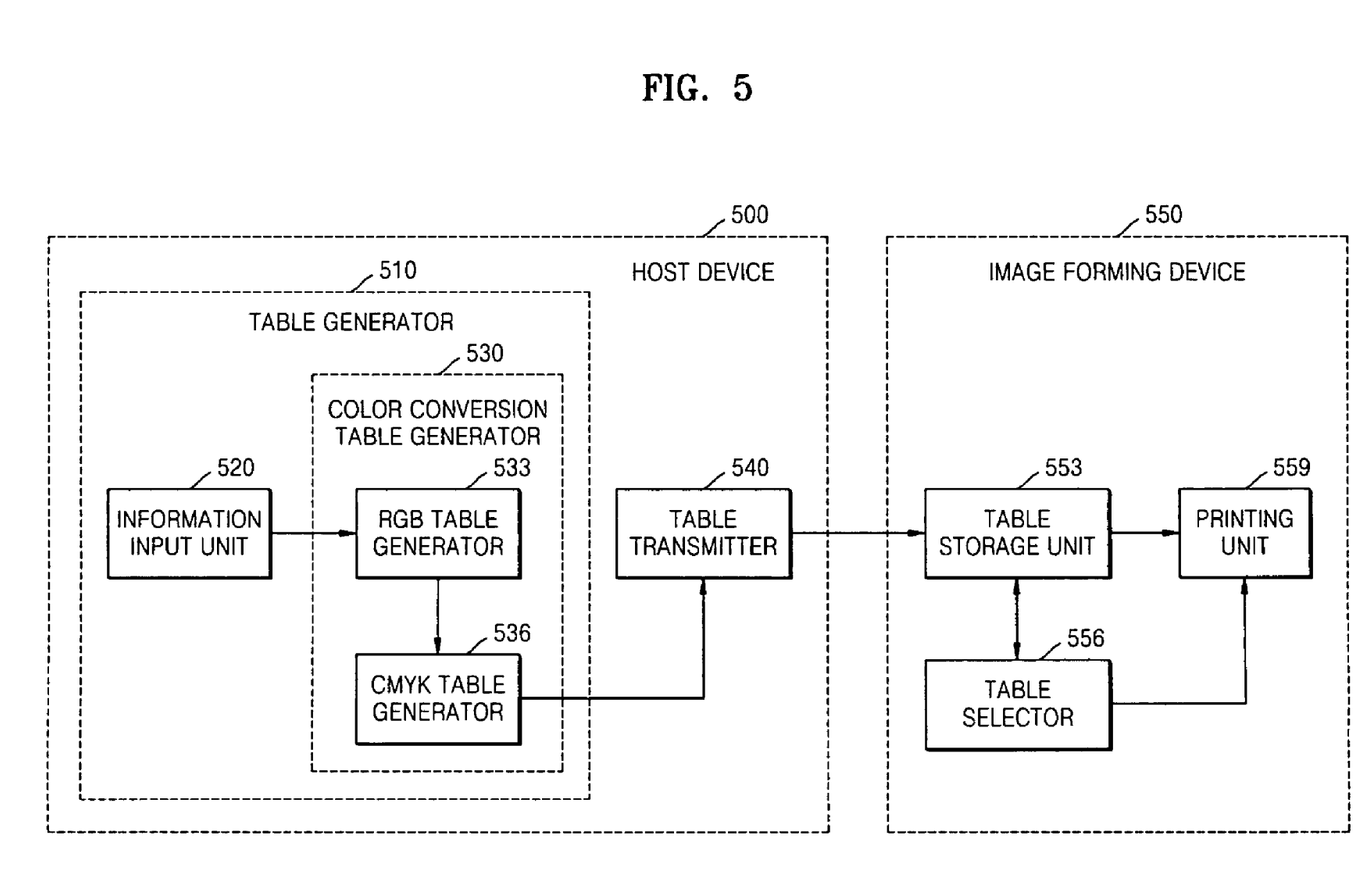
FIG. 5 is a block diagram of an apparatus which performs a printing job by adjusting color information according to an embodiment of the present invention.

FIG. 5 is a block diagram of an apparatus which performs a printing job by adjusting color information according to an embodiment of the present invention. Referring to FIG. 5, the apparatus includes a host device 500 and an image forming device 550.

The host device 500 includes a table generator 510 and a table transmitter 540.

The table generator 510 generates a color conversion table based on color adjustment information which the table generator 510 receives. As described earlier, color adjustment information is information used to adjust various factors used to print colors, such as brightness, contrast, saturation, Gamma, S-like curve, and preferable color. The color conversion table is a lookup table containing color information, such as color information C, M, Y, and K which corresponds to generally used color information R, G, and B used to perform a printing job in the image forming device 550. The table generator 510 includes an information input unit 520 and a color conversion table generator 530.

The information input unit 520 inputs color adjustment information from a user by providing a user interface which adjusts color information. This user interface may be, for example, the printer registration information in a control panel of a Windows program, but is not limited to such.

The color conversion table generator 530 generates an RGB-to-CMYK table using the color adjustment information inputted via the information input unit 520. The color conversion table generator 530 includes an RGB table generator 533 and a CMYK table generator 536.

The RGB table generator 533 generates an RGB-to-RGB table using the color adjustment information inputted via the information input unit 520. For example, if a user inputs color adjustment information via the information input unit 520 to increase the brightness by 10, the RGB table generator 533 generates an RGB-to-RGB table in which (0,0,0)→(10,10,10), (0,0,16)→(10,10,26), (0,0,32)→(10,10,42), . . . , (0,0,240)→(10,10,250), (0,0,255)→(10,10,255), (0,16,0)→(10,26,10), . . . , (0,16,255)→(10,26,255), (16,0,0)→(26,10,10), . . . , (16,255,255)→(26,255,255), . . . , (255,255,255)→(255,255,255) are set by increasing the brightness by 10 from an existing default RGB-to-RGB table in which (0,0,0)→(0,0,0), (0,0,16)→(0,0,16), (0,0,32)→(0,0,32), . . . , (0,0,240)→(0,0,240), (0,0,255)→(0,0,255), (0,16,0)→(0,16,0), . . . , (0,16,255)→(0,16,255), . . . , (16,0,0)→(16,0,0), . . . , (16,255,255)→(16,255,255), . . . , (255,255,255)→(255,255,255) are set.

The CMYK table generator 536 generates an RGB-to-CMYK table by combining the RGB-to-RGB table generated by the RGB table generator 533 with a default RGB-to-CMYK table.

The table transmitter 540 temporarily stores the RGB-to-CMYK table generated by the CMYK table generator 536 and transmits the temporarily stored RGB-to-CMYK table to a table storage unit 553 in response to a printing request. The table storage unit 553 is included in the image forming device 550.

The image forming device 550 includes the table storage unit 553, a table selector 556, and a printing unit 559.

The table storage unit 553 receives the RGB-to-CMYK table generated by the CMYK table generator 536 from the table transmitter 540, replaces an existing RGB-to-CMYK table with the generated RGB-to-CMYK table generated by the CMYK table generator 536, and stores the updated RGB-to-CMYK table.

The printing unit 559 performs a printing job using the updated RGB-to-CMYK table stored in the table storage unit 553. Specifically, the printing unit 559 converts the RGB color information of printing data requested by the user into CMYK color information using the RGB-to-CMYK table stored in the table storage unit 553. Then, the printing unit 559 performs a TRC operation on each of the C, M, Y, and K channels with respect to the converted CMYK color information. Next, the printing unit 559 performs a half-toning operation for each of the C, M, Y, and K channels which have undergone the TRC operation. Next, the printing unit 559 formats the half-toned C, M, Y, and K channels. Finally, the printing unit 559 prints the formatting result onto a printing medium.

Since the user may perform the color adjustment process several times, a plurality of RGB-to-CMYK tables corresponding to the repeated color adjustment processes may eventually be stored in the table storage unit 553. In order to manage this plurality of RGB-to-CMYK tables, another embodiment may be implemented as described below.

The table selector 556 provides a user interface which permits the user to select an RGB-to-CMYK table from among RGB-to-CMYK tables stored in the table storage unit 553 to use for the current printing job. Then, the printing unit 559 performs a printing job using the RGB-to-CMYK table selected by the user through the table selector 556.

The invention may also be embodied as computer readable codes on a computer readable recording medium. Computers may include any devices or systems which have an information processing function. The computer readable recording medium is any data storage device that stores data which a computer system later reads. Examples of computer readable recording media include read-only memory (ROM), random-access memory (RAM), CD-ROMs, magnetic tapes, floppy disks, and optical data storage devices.

As described above, a method and apparatus to perform a printing job by adjusting color information according to embodiments of the present invention includes inputting color adjustment information from a user, updating a color conversion table stored in an image forming device, and using the updated color conversion table.

By implementing a method and apparatus to perform a printing job by adjusting color information according to embodiments of the present invention, a printing job is performed by adjusting color information regardless of whether an emulator of the image forming device supports a color adjustment function used. In addition, embodiments of the present invention reduce the time needed for color conversion when printing jobs are performed, since the color information is converted using the same updated color conversion table having the color adjustment information, instead of repeatedly adjusting color information using the same color adjustment information. In addition, even if a function of an image forming device driver is changed to add a color adjustment function to the image forming device, a function of the emulator does not have to be changed to perform a printing job.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing a printing job by adjusting color information, the method comprising:
   updating, by a processor, a stored color conversion table by inputting color adjustment information from a user; and
   performing, by the processor, the printing job using an updated color conversion table which is an RGB-to-CMYK (Cyan Magenta Yellow Black) table generated by combining a generated RGB-to-RGB table based on the input color adjustment information with a stored default RGB-to-CMYK table.

2. The method of claim 1, wherein the updating comprises:
   inputting the color adjustment information from the user;
   generating a color conversion table using the input color adjustment information; and
   updating the stored color conversion table to the generated color conversion table.

3. The method of claim 2, wherein the user uses a user interface to input the color adjustment information.

4. The method of claim 3, wherein, the generated color conversion table is transmitted to the image forming device and updates the stored conversion table if a printing request is inputted after the generation of the generated color conversion table.

5. A method of performing a printing job by adjusting color information, the method comprising:
   updating, by a processor, a stored color conversion table by inputting color adjustment information from a user; and
   performing, by the processor, the printing lob using an updated color conversion table, wherein the updating comprises:
   inputting the color adjustment information from the user;
   generating a color conversion table using the input color adjustment information; and
   updating the stored color conversion table to the generated color conversion table, wherein the generating comprises:
   generating an RGB (Red Blue Green)-to-RGB table using the input color adjustment information; and
   generating the color conversion table as an RGB-to-CMYK (Cyan Magenta Yellow Black) table by combining the generated RGB-to-RGB table with a stored default RGB-to-CMYK table.

6. The method of claim 1, further comprising:
   storing a plurality of the updated color conversion tables; and
   enabling a user to select a color conversion table among the plurality of the stored updated color conversion tables to perform the printing job.

7. The method of claim 6, wherein the printing job is performed using the selected color conversion table.

8. The method of claim 3, wherein the user interface is located on a host device.

9. The method of claim 3, wherein the user interface is located on an image forming device.

10. A computer-readable recording medium which stores a computer-readable program which executes the method of claim 1.

* * * * *

UNITED STATES PATENT AND TRADEMARK OFFICE
CERTIFICATE OF CORRECTION

| | | |
|---|---|---|
| PATENT NO. | : 8,018,620 B2 | |
| APPLICATION NO. | : 11/546482 | |
| DATED | : September 13, 2011 | |
| INVENTOR(S) | : Jung | |

It is certified that error appears in the above-identified patent and that said Letters Patent is hereby corrected as shown below:

Column 8, Line 24, In Claim 5, delete "lob" and insert -- job --, therefor.

Signed and Sealed this
Seventh Day of February, 2012

David J. Kappos
*Director of the United States Patent and Trademark Office*